May 9, 1933.  C. A. HULSART  1,908,020

TUBE SEAT

Original Filed Dec. 18, 1928

INVENTOR
Charles A. Hulsart
BY
Gifford & Scull
ATTORNEYS.

Patented May 9, 1933

1,908,020

UNITED STATES PATENT OFFICE

CHARLES A. HULSART, OF WESTFIELD, NEW JERSEY, ASSIGNOR TO THE BABCOCK & WILCOX COMPANY, OF BAYONNE, NEW JERSEY, A CORPORATION OF NEW JERSEY

TUBE SEAT

Application filed December 18, 1928, Serial No. 326,778. Renewed May 27, 1932.

This invention relates to a novel and improved form of tube seat particularly adapted for use in connection with high-pressure receptacles such as a boiler drum. In the accompanying drawing, in which I have shown selected embodiments of the invention:—

Figure 1:
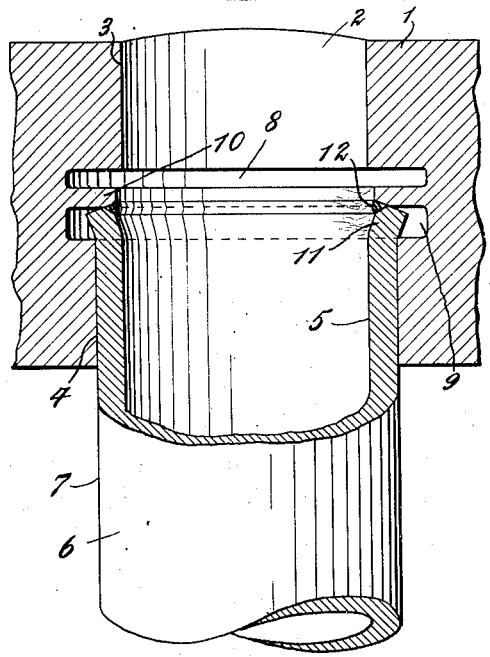
Fig. 1 is a fragmentary sectional view through a portion of a drum wall showing a tube expanded into a hole therein.

Referring first to Fig. 1, I have shown therein a portion 1 of the wall of a high-pressure receptacle which may conveniently be a drum in a high-pressure boiler. Such a drum is provided with the relatively thick wall shown in this drawing. Extending through the wall is a hole 2 which is shown as being formed of two portions, 3 and 4. The portion 3 is of substantially the same diameter as the interior 5 of the tube 6, while the portion 4 is of substantially the same diameter as the exterior 7 of the same tube.

Between the two portions 3 and 4, the wall 1 is provided with two circumferential grooves 8 and 9 defining between them a rib 10 which extends inwardly towards the center of the hole. The tube end 11 is expanded outwardly into the groove 9 and contacts with the rib 10 as plainly shown, and it will be obvious that the interior 5 of the tube will be in substantial alignment with the surface of the portion 2 of the hole. Preferably, a welded joint 12 is provided between the tube end and the rib.

By the above construction, the welded joint effectively seals the tube to the receptacle, thereby preventing leakage. The narrow rib 10 will prevent an undue amount of heat from the welding operation from reaching the metal of the wall 1. This rib is preferably made long and relatively thin for this purpose. Moreover, the rib may yield slightly when the tube end is expanded into the groove 9, in case the tube is somewhat too long.

Figure 2:
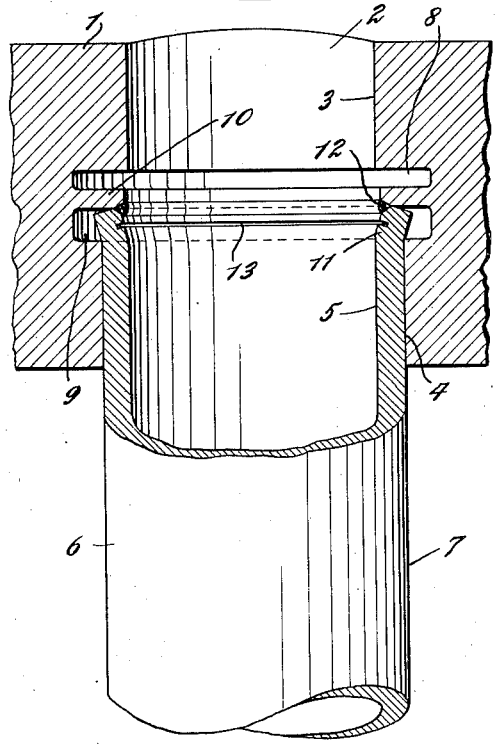
Figs. 2 and 3 are views similar to Fig. 1, but showing different forms which the invention may take.

In Fig. 2 is shown a construction similar to that in Fig. 1, except that here the tube end 11 is provided with a circumferential groove 13 adjacent the welded joint. This groove will limit the amount of heat from the welding process which might pass along the tube.

Figure 3:
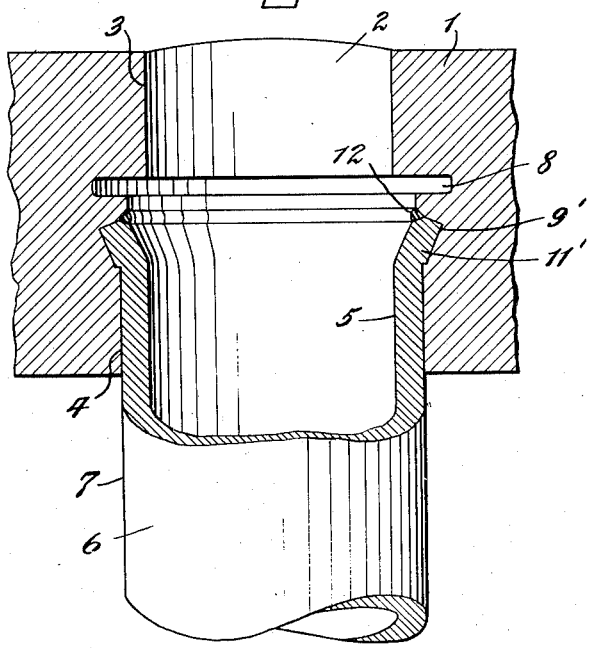

In Fig. 3 is shown a still third form which the invention may take. In this form the groove 9' is of a form to snugly receive the expanded end 11' of the tube. Otherwise, this form corresponds closely to that shown in Fig. 1.

I claim:—

1. In combination, a high-pressure receptacle having a thick wall with a tube hole therethrough, a rib extending inwardly towards the center of said hole between the ends thereof, and a tube extending into said hole and having its end engaging said rib and welded thereto.

2. In combination, a high-pressure receptacle having a thick wall with a tube hole therethrough, a rib extending inwardly towards the center of said hole between the ends thereof, and a tube extending into said hole and having its end engaging said rib and welded thereto, said tube end being expanded into a groove in said wall adjacent said rib.

3. In combination, a high-pressure receptacle having a thick wall with a tube hole therethrough, a narrow projection extending inwardly towards the center of said hole between the ends thereof, and a tube extending into said hole and having its end engaging said projection and welded thereto, said tube end being expanded into a groove in said wall adjacent said projection.

4. In combination, a high-pressure receptacle having a thick wall with a tube hole therethrough, said wall within the hole having two circumferential grooves defining a rib therebetween, and a tube extending into said hole and having its end expanded into one of said grooves and engaging said rib.

5. In combination, a high-pressure receptacle having a thick wall with a tube hole therethrough, said wall within the hole having two circumferential grooves defining a rib therebetween, and a tube extending into said hole and having its end expanded into one of said grooves and engaging said rib and welded thereto.

6. In combination, a high-pressure receptacle having a thick wall with a tube hole therethrough, said hole having two portions, one of said portions having substantially the diameter of the interior of a tube, and the other of said portions having substantially the diameter of the exterior of a tube, a tube disposed in said second-named portion with its end adjacent said first-named portion, a rib between the ends of the hole and extending inwardly towards the center of said hole and engaging said tube end, and a welded joint between said end and rib.

7. In combination, a high-pressure receptacle having a thick wall with a tube hole therethrough, said hole having two portions, one of said portions having substantially the diameter of the interior of a tube, and the other of said portions having substantially the diameter of the exterior of a tube, a tube disposed in said second-named portion with its end adjacent said first-named portion and expanded into a groove in said wall, and a rib between the ends of the hole and extending inwardly towards the center of said hole between said first-named portion and said tube end and engaging the tube end.

8. In combination, a high-pressure receptacle having a thick wall with a tube hole therethrough, said hole having two portions, one of said portions having substantially the diameter of the interior of a tube, and the other of said portions having substantially the diameter of the exterior of a tube, a tube disposed in said second-named portion with its end adjacent said first-named portion and expanded into a groove in said wall, a rib between the ends of the hole and extending inwardly towards the center of said hole between said first-named portion and said tube end and engaging the tube end, and a welded joint between said end and rib.

9. In combination, a high pressure receptacle having a thick wall with tube holes formed therethrough, narrow circumferential projections originating at positions removed from the outer ends of the tube holes and extending from the metal of the wall, and tubes expanded against the wall in the tube holes and end welded to the projections.

10. In combination, a high pressure receptacle having a thick wall with a tube hole therethrough, a narrow projection extending inwardly towards the center of said hole between the ends thereof, and a tube extending into said hole and having its end engaging said projection and welded thereto, said tube end being expanded against the sides of the tube hole.

11. In combination, a high pressure receptacle having a thick wall with a tube hole therethrough, said wall within the hole having two circumferential grooves defining a rib therebetween, and a tube extending into said hole and having its end expanded therein.

12. In combination, a high pressure receptacle having a thick wall with a tube hole therethrough, said wall within the hole having two circumferential grooves defining a rib therebetween, and a tube extending into said hole and having its end expanded against the walls of the tube hole and welded to the rib.

13. In a pressure vessel capable of withstanding high fluid pressures, a thick metallic wall having tube seats formed therein in tube holes extending through the wall, tubes in communication with the vessel and having end portions expanded against the walls of the tube seats, and flexible metallic parts supported by the wall and extending into contact with the tube ends, the tubes being end welded to said parts.

14. In combination, a pressure vessel having a thick wall with tube seats formed as holes therethrough, circular extensions originating at the sides of the tube holes and extending therefrom, tubes extending through the tube holes with their ends contiguous to the free ends of the extensions and end welded thereto.

CHARLES A. HULSART.